(12) United States Patent
Endo et al.

(10) Patent No.: US 6,712,718 B2
(45) Date of Patent: Mar. 30, 2004

(54) THREE-PIECE SOLID GOLF BALL (75) Inventors: Seiichiro Endo, Kobe (JP); Keiji Ohama, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 10/277,727

(22) Filed: Oct. 23, 2002

(65) Prior Publication Data

US 2003/0139229 A1 Jul. 24, 2003

(30) Foreign Application Priority Data

Oct. 23, 2001 (JP) ........................................ 2001-325073
Aug. 13, 2002 (JP) ........................................ 2002-235762

(51) Int. Cl.$^7$ ............................................... A63B 37/06
(52) U.S. Cl. ........................................ 473/374; 473/378
(58) Field of Search ................................. 473/367, 368, 473/370, 371, 373, 374, 376, 378, 384, 383

(56) References Cited

U.S. PATENT DOCUMENTS

| | | | |
|---|---|---|---|
| 5,439,227 A | 8/1995 | Egashira et al. | |
| 5,556,098 A | 9/1996 | Higuchi et al. | |
| 5,830,085 A | 11/1998 | Higuchi et al. | |
| 5,911,639 A | * 6/1999 | Kasashima et al. | ......... 473/377 |
| 5,967,908 A | 10/1999 | Yamagishi et al. | |
| 6,210,292 B1 | 4/2001 | Higuchi et al. | |
| 6,379,268 B1 | 4/2002 | Yamagishi et al. | |

FOREIGN PATENT DOCUMENTS

| | | |
|---|---|---|
| JP | 2570587 B2 | 10/1996 |
| JP | 2658811 B2 | 6/1997 |
| JP | 9-313643 A | 12/1997 |
| JP | 10-305114 A | 11/1998 |
| JP | 2000-70408 A | 3/2000 |
| JP | 2000-70409 A | 3/2000 |
| JP | 2000-70414 A | 3/2000 |
| JP | 2000-254252 A | 9/2000 |

* cited by examiner

Primary Examiner—Raeann Gorden
(74) Attorney, Agent, or Firm—Birch, Stewart, Kolasch & Birch, LLP (57) ABSTRACT

The present invention provides a three-piece solid golf ball, of which flight distance is improved by accomplishing high launch angle and low spin amount in initial flight performance, while maintaining good shot feel such that the rebound characteristics are good, when hit at low head speed. The present invention relates to a three-piece solid golf ball comprising a center, an intermediate layer and a cover having many dimples on the surface thereof, wherein hardness distribution of the center; hardness distribution between each layer and the contiguous layer in the golf ball; and a ratio of the golf ball surface area occupied by the dimple to the total surface area of the golf ball and the total of a periphery length of the dimple; are adjusted to specified ranges.

12 Claims, 1 Drawing Sheet

THREE-PIECE SOLID GOLF BALL

FIELD OF THE INVENTION

The present invention relates to a three-piece solid golf ball. More particularly, it relates to a three-piece solid golf ball, of which flight distance is improved by accomplishing high launch angle and low spin amount in initial flight performance, while maintaining good shot feel such that the rebound characteristics are good, when hit at low head speed.

BACKGROUND OF THE INVENTION

In golf balls commercially selling, there are solid golf balls such as two-piece golf ball, three-piece golf ball and the like, and thread wound golf balls. Recently, the two-piece golf ball and three-piece golf ball, of which flight distance can be improved while maintaining soft and good shot feel at the time of hitting as good as the conventional thread wound golf ball, generally occupy the greater part of the golf ball market. Multi-piece golf balls such as three-piece golf ball have good shot feel while maintaining excellent flight performance, because they can vary hardness distribution and design of golf balls, when compared with the two-piece golf ball.

A golf ball has many depressions called "dimples" on the surface. The dimples have function to disturb airflow around the golf ball on the fly and to facilitate turbulent transition at boundary layer so as to give rise to turbulent separation, which is called "dimple effect". The facilitation of turbulent transition sifts the separation point of air from the golf ball to backward and reduces a drag coefficient, to result in an increase of flight distance. In addition, the facilitation of turbulent transition increases a difference of the separation point between an upper side and a lower side of the golf ball, caused by backspin of the golf ball, and enhances lifting power applied on the golf ball. Therefore, the properties of dimples have been adjusted to a proper range in order to improve the flight performance.

The three-piece solid golf balls are obtained by inserting an intermediate layer between the core and the cover layer constituting the two-piece solid golf ball and have been described in Japanese Patent Kokai Publication Nos. 313643/1997, 305114/1998, 70408/2000, 70409/2000, 70414/2000, 254252/2000 and Japanese Patent Nos. 2570587 and 2658811. In the golf balls, it has been attempted to compromise the balance of flight performance and shot feel at the time of hitting by using thermoplastic resin, such as ionomer resin, thermoplastic elastomer (such as polyurethane-based thermoplastic elastomer) or mixtures thereof for the intermediate layer, to adjust a hardness, hardness distribution and the like of the core, intermediate layer and cover, properties of dimples and the like to proper ranges.

In Japanese Patent No. 2658811, a three-piece solid golf ball, of which an intermediate layer is placed between a center core and a cover, is described. The center core has a diameter of not less than 26 mm, a specific gravity of less than 1.4 and a JIS-C hardness of not more than 80, the intermediate layer is mainly formed from polyester-based thermoplastic elastomer and has a thickness of not less than 1 mm, a specific gravity of less than 1.2 and a JIS-C hardness of less than 80, and the cover has a thickness of 1 to 3 mm and a JIS-C hardness of not less than 85.

In Japanese Patent Kokai Publication No. 254252/2000, a golf ball having a multi-layer structure of at least three layers, of which an intermediate layer (cover inner layer) is placed between a core and a cover, is described. The core has narrow hardness distribution, and the golf ball has a hardness distribution such that the surface of the core is the softest and the hardness successively increases in order of the surface of the core, the intermediate layer (cover inner layer) and the cover (cover outer layer), and properties of dimples (a diameter of the dimple, depth of the dimple and total number of the dimples) are adjusted to proper ranges.

However, in the golf balls described above, it has been problem that when hit at low head speed, high launch angle and low spin amount are not accomplished, and flight performances is degraded, or shot feel is hard and poor. In addition, the problem has not been considered. There has been no golf ball, which is sufficient to accomplish the balance between flight performance and shot feel at the time of hitting. It has been required to provide golf balls, of which the shot feel and the flight performance are improved still more.

OBJECTS OF THE INVENTION

A main object of the present invention is to provide a three-piece solid golf ball, of which flight distance is improved by accomplishing high launch angle and low spin amount in initial flight performance, while maintaining good shot feel such that the rebound characteristics are good, when hit at low head speed.

According to the present invention, the object described above has been accomplished by providing a three-piece solid golf ball, of which an intermediate layer is placed between a center and a cover, and by adjusting hardness distribution of the center; hardness distribution between each layer and the contiguous layer in the golf ball; and a ratio of the golf ball surface area occupied by the dimple to the total surface area of the golf ball and the total of a periphery length of the dimple to specified ranges, thereby providing a three-piece solid golf ball, of which flight distance is improved by accomplishing high launch angle and low spin amount in initial flight performance, while maintaining good shot feel such that the rebound characteristics are good, when hit at low head speed.

This object as well as other objects and advantages of the present invention will become apparent to those skilled in the art from the following description with reference to the accompanying drawings.

BRIEF EXPLANATION OF DRAWINGS

The present invention will become more fully understood from the detailed description given hereinbelow and the accomplishing drawings which are given by way of illustrating only, and thus are not limitative of the present invention, and wherein.

SUMMARY OF THE INVENTION

The present invention provides a three-piece solid golf ball comprising a center, an intermediate layer formed on the center and a cover covering the intermediate layer and having many dimples on the surface thereof, wherein the center has a maximum hardness difference in Shore D hardness from the central point to the surface of not more than 7 and a surface hardness ($H_S$) of 36 to 50, a base resin of the intermediate layer is formed from thermoplastic resin, and the intermediate layer has a hardness ($H_M$) in Shore D hardness of 36 to 50, a base resin of the cover is formed from thermoplastic resin mainly comprising ionomer resin, and the cover has a hardness ($H_L$) in Shore D hardness of 58 to 69, the surface hardness of the center ($H_S$) is higher than the hardness of the intermediate layer ($H_M$) by 0 to 15, and the hardness of the cover ($H_L$) is higher than the hardness of the intermediate layer ($H_M$, by 10 to 28, assuming that the total of a periphery length of the dimple is represented by X (mm) and a ratio of the golf ball surface area occupied by the dimple to the total surface area of the golf ball is represented by Y, the X and Y satisfy the correlation represented by the following formula (1):

$$X \leq 1930 + 3882Y \quad (1)$$

and Y is within the range of 0.70 to 0.90.

In order to put the present invention into a more suitable practical application, it is preferable that the intermediate layer have a thickness of 1.0 to 2.1 mm, and the cover have a thickness of 1.0 to 2.1 mm;

the thickness of the cover be not less than that of the intermediate layer;

the base resin of the intermediate layer be formed from thermoplastic resin having a weight ratio of thermoplastic elastomer to ionomer resin of 20/80 to 70/30, and the base resin of the cover be formed from thermoplastic elastomer comprising ionomer resin as a main component; and the number of dimples having a periphery length of not less than 10.5 mm be larger than 90%, based on the total number of dimples.

DETAILED DESCRIPTION OF THE INVENTION

Figure 1:
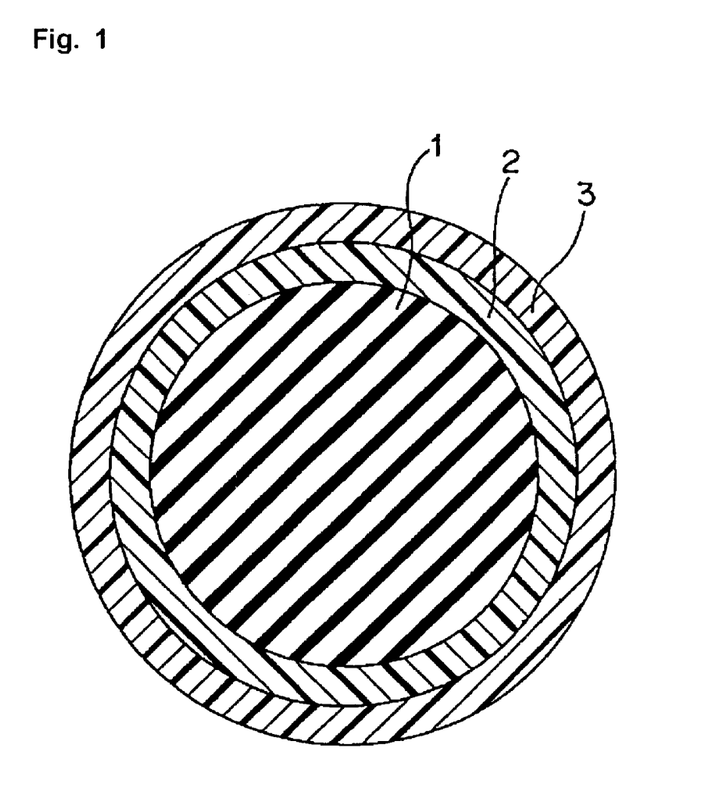
FIG. 1 is a schematic cross section illustrating one embodiment of the golf ball of the present invention.

The three-piece solid golf ball of the present invention will be explained with reference to the accompanying drawing in detail. FIG. 1 is a schematic cross section illustrating one embodiment of the three-piece solid golf ball of the present invention. As shown in FIG. 1, the golf ball of the present invention comprises a center 1, an intermediate layer 2 formed on the center 1, and a cover 3 covering the intermediate layer 2. The center 1 is obtained by vulcanizing or press-molding the rubber composition using a method and condition, which have been conventionally used for cores of solid golf balls. The rubber composition contains a base rubber, a co-crosslinking agent, an organic peroxide, a filler and the like.

The base rubber may be synthetic rubber, which has been conventionally used for cores of solid golf balls. Preferred is high-cis polybutadiene rubber containing a cis-1, 4 bond of not less than 40%, preferably not less than 80%. The high-cis polybutadiene rubber may be optionally mixed with natural rubber, polyisoprene rubber, styrene-butadiene rubber, ethylene-propylene-diene rubber (EPDM) and the like.

The co-crosslinking agent can be α,β-unsaturated carboxylic acids having 3 to 8 carbon atoms (e.g. acrylic acid, methacrylic acid, etc.) or a metal salt thereof, including mono or divalent metal salts, such as zinc, magnesium, or calcium salts; or mixtures thereof and the like. The preferred co-crosslinking agent is zinc acrylate, because it imparts high rebound characteristics to the resulting golf ball. The amount of the co-crosslinking agent is from 20 to 30 parts by weight, preferably from 21 to 29 parts by weight, based on 100 parts by weight of the base rubber. When the amount of the co-crosslinking agent is smaller than 20 parts by weight, the vulcanization is not sufficiently conducted, and the center is too soft. Therefore, the rebound characteristics are degraded, which reduces the flight distance. On the other hand, when the amount of the co-crosslinking agent is larger than 30 parts by weight, the resulting golf ball is too hard, and the shot feel is poor.

The organic peroxide, which acts as a crosslinking agent or hardener, includes, for example, dicumyl peroxide, 1,1-bis (t-butylperoxy)-3,3,5-trimethylcyclohexane, 2,5-dimethyl-2,5-di(t-butylperoxy) hexane, di-t-butyl peroxide and the like. The preferred organic peroxide is dicumyl peroxide. The amount of the organic peroxide is from 0.1 to 3.0 parts by weight, preferably 0.1 to 2.8 parts by weight, more preferably 0.2 to 2.5 parts by weight, based on 100 parts by weight of the base rubber. When the amount of the organic peroxide is smaller than 0.1 parts by weight, the center is too soft, and the rebound characteristics of the resulting golf ball are degraded, which reduces the flight distance. On the other hand, when the amount of the organic peroxide is larger than 3.0 parts by weight, the center is too hard, and the shot feel of the resulting golf ball is poor.

The filler, which can be typically used for the core of solid golf ball, includes for example, inorganic filler (such as zinc oxide, barium sulfate, calcium carbonate and the like), high specific gravity metal powder filler (such as tungsten powder, molybdenum powder and the like), and the mixture thereof. The amount of the filler is not limited and can vary depending on the specific gravity and size of the cover and center, but is from 5 to 50 parts by weight, based on 100 parts by weight of the base rubber.

The rubber compositions for the center the golf ball of the present invention can contain other components, which have been conventionally used for preparing the core of solid golf balls, such as antioxidant or peptizing agent.

The center 1 used for the golf ball of the present invention can be obtained by vulcanizing and press-molding the above rubber composition in a mold at 130 to 180° C. and 2.8 to 9.8 MPa for 10 to 50 minutes, but the vulcanization condition is not limited. In the golf ball of the present invention, it is suitable for the center 1 to have a diameter of 34.2 to 38.8 mm, preferably 35.0 to 37.6 mm. When the diameter of the center 1 is smaller than 34.2 mm, the intermediate layer and cover are thick, and the technical effects of improving the rebound characteristics accomplished by the presence of the center are not sufficiently obtained. On the other hand, when the diameter is larger than 38.8 mm, the thickness of the intermediate layer and that of the cover are too small, and the technical effects of absorbing impact force accomplished by the presence of the intermediate layer and cover are not sufficiently obtained.

In the golf ball of the present invention, it is desired for the center 1 to have a deformation amount when applying from an initial load of 98 N to a final load of 1275 N of 3.0 to 5.5 mm, preferably 3.5 to 5.4 mm, more preferably 3.5 to 5.3 mm. When the deformation amount of the center is smaller than 3.0 mm, the center is too hard, and it is difficult for the center to deform at the time of hitting, which degrades the shot feel of the resulting golf ball. In addition, the launch angle is low and the spin amount is large, and the flight performance is degraded. On the other hand, when the deformation amount is larger than 5.5 mm, the center is too soft, and the rebound characteristics are degraded, which reduces the flight distance.

In the golf ball of the present invention, it is required for the center 1 to have a maximum hardness difference in Shore D hardness from the central point to the surface of not more than 7, preferably not more than 6, more preferably not more than 5. When the hardness difference is larger than 7, the durability is poor, or the shot feel is poor such that the rebound characteristics are poor.

In the golf ball of the present invention, it is required for the center 1 to have the surface hardness ($H_S$) in Shore D hardness of 36 to 50, preferably 36 to 49, more preferably 37 to 49. When the surface hardness is lower than 36, the center is too soft, and the rebound characteristics of the resulting golf ball are degraded, which reduces the flight distance. On the other hand, when the surface hardness is higher than 50, the center is too hard, and the shot feel of the resulting golf ball is poor. In addition, the launch angle is low and the spin amount is large, which degrades the rebound characteristics.

The term "a maximum hardness difference from the central point to the surface of the center" as used herein refers to a difference between the maximum hardness and minimum hardness among a central point hardness, a hardness at the distance of 5, 10 and 15 mm from the central point, and a surface hardness of the center. The term "surface hardness of the center ($H_S$)" as used herein refers to the hardness, which is determined by measuring a Shore D hardness at the surface of the resulting center. The term "a central point hardness, a hardness at the distance of 5, 10 and 15 mm from the central point of the center" as used herein refers to the hardness, which is determined by cutting the resulting center into two equal parts and then measuring a Shore D hardness at its center point and the distance of 5, 10 and 15 mm from the central point in section.

In the golf ball of the present invention, the center 1 typically has a specific gravity of 1.05 to 1.25, which can be adjusted by the amount of the filler and the like in order to obtain the desired golf ball weight. The intermediate layer 2 is then formed on the center 1.

The intermediate layer 2 of the present invention contains thermoplastic resin, such as ionomer resin, thermoplastic elastomer, or mixtures thereof, as a base resin. As the materials suitably used in the intermediate layer 2 of the present invention, a combination of at least one thermoplastic elastomer and at least one ionomer resin can be suitably used.

Examples of the thermoplastic elastomers, which are commercially available, include polyamide-based thermoplastic elastomer, which is commercially available from Toray Co., Ltd. under the trade name of "Pebax" (such as "Pebax 2533"); polyester-based thermoplastic elastomer, which is commercially available from Toray-Do Pont Co., Ltd. under the trade name of "Hytrel" (such as "Hytrel 3548", "Hytrel 4047"); polyurethane-based thermoplastic elastomer, which is commercially available from BASF Polyurethane Elastomers Co., Ltd. under the trade name of "Elastollan" (such as "Elastollan ET880"); polyurethane-based thermoplastic elastomer, which is commercially available from Dainippon Ink & Chemicals Inc., Ltd. under the trade name of "Pandex" (such as "Pandex T-8180"); styrene-based thermoplastic elastomer, which is commercially available from Mitsubishi Chemical Co., Ltd. under the trade name of "Rabalon" (such as "Rabalon SR04); and the like. Preferred are polyester-based thermoplastic elastomer or styrene-based thermoplastic elastomer, in view of rebound characteristics.

The styrene-based thermoplastic elastomer includes thermoplastic elastomer having styrene block, that is, block copolymers having styrene block and conjugated diene compound block. Examples of the conjugated diene compounds include butadiene, isoprene, 1,3-pentadiene, 2,3-dimethyl-1,3-butadiene and the like, or mixtures thereof. Preferred are butadiene, isoprene and combinations thereof.

The styrene-based thermoplastic elastomer can be styrene-butadiene-styrene block copolymer (SBS); styrene-isoprene-styrene block copolymer (SIS); styrene-isoprene-butadiene-styrene block copolymer (SIBS); or hydrogenation product thereof. That is, the styrene-based thermoplastic elastomer can be the SBS or hydrogenation product thereof; the SIS or hydrogenation product thereof; or the SIBS or hydrogenation product thereof. As the hydrogenation product of the SBS, for example, styrene-ethylene-butylene-styrene block copolymer (SEBS) obtained by hydrogenating double bond of butadiene portion in SBS may be used. As the hydrogenation product of the SIS, for example, styrene-ethylene-propylene-styrene block copolymer (SEES) obtained by hydrogenating double bond of isoprene portion in SIS may be used. As the hydrogenation product of the SIBS, for example, styrene-ethylene-ethylene-propylene-styrene block copolymer (SEEPS) obtained by hydrogenating double bond of butadiene portion or isoprene portion in SIBS may be used.

The styrene-based thermoplastic elastomer can be polymer alloys of
olefin; and
styrene-butadiene-styrene block copolymer (SBS), hydrogenation product of SBS, styrene-isoprene-styrene block copolymer (SIS), hydrogenation product of SIS, styrene-isoprene-butadiene-styrene block copolymer (SIBS), or hydrogenation product of SIBS. Examples thereof include the polymer alloy commercially available from Mitsubishi Chemical Co., Ltd. under the trade name of "Rabalon" (such as "Rabalon SJ4400N", "Rabalon SJ5400N", "Rabalon SJ6400N", "Rabalon SJ7400N", "Rabalon SJ8400N", "Rabalon SJ9400N", "Rabalon SR04" and the like).

Examples of the thermoplastic elastomer having styrene block include styrene-butadiene-styrene block copolymer (SBS); styrene-ethylene-butylene-styrene block copolymer (SEBS), of which the double bond in the butadiene portion of the SBS is hydrogenated; styrene-isoprene-styrene block copolymer (SIS); styrene-ethylene-propylene-styrene block copolymer (SEPS), of which the double bond in the isoprene portion of the SIS is hydrogenated; styrene-isoprene-butadiene-styrene block copolymer (SIBS); styrene-ethylene-ethylene-propylene-styrene block copolymer (SEEPS), of which the double bond in butadiene portion or isoprene portion of SIBS; and modification thereof.

In the present invention, the SBS, the SEBS, the SIS and the SEPS may have epoxy groups in a portion of the block copolymer. The wording "styrene-butadiene-styrene block copolymer (SBS) containing epoxy groups" as used herein means block copolymer in which polybutadiene block containing epoxy groups is sandwiched by two polystyrene blocks, and may be the block copolymer, of which a portion or all of the double bonds in the polybutadiene portion is hydrogenated. The wording "styrene-isoprene-styrene block copolymer (SIS) containing epoxy groups" as used herein means block copolymer in which polyisoprene block containing epoxy groups is sandwiched by two polystyrene blocks, and may be the block copolymer, of which a portion or all of the double bonds in the polyisoprene portion is hydrogenated.

Examples of the epoxidized SBS or epoxidized SIS include styrene-butadiene-styrene block copolymer (SBS) comprising polybutadiene block containing epoxy groups commercially available from Daicel Chemical Industries, Ltd. under the trade name of "Epofriend" (such as "Epofriend A1010" and the like). Examples of the SEBS or SEPS having terminal OH groups are commercially available from Kuraray Co., Ltd. under the trade name of "Septon" (such as "Septon HG-252").

The ionomer resin may be a copolymer of α-olefin and α,β-unsaturated carboxylic acid, of which a portion of carboxylic acid groups is neutralized with metal ion, or a terpolymer of α-olefin, α,β-unsaturated carboxylic acid and α,β-unsaturated carboxylic acid ester, of which a portion of carboxylic acid groups is neutralized with metal ion. Examples of the α-olefins in the ionomer preferably include ethylene, propylene and the like. Examples of the α,β-unsaturated carboxylic acid in the ionomer include acrylic acid, methacrylic acid, fumaric acid, maleic acid, crotonic acid and the like, preferred are acrylic acid and methacrylic acid. Examples of the α,β-unsaturated carboxylic acid ester in the ionomer include methyl ester, ethyl ester, propyl ester, n-butyl ester and isobutyl ester of acrylic acid, methacrylic acid, fumaric acid, maleic acid, crotonic acid and the like. Preferred are acrylic acid esters and methacrylic acid esters. The metal ion which neutralizes a portion of carboxylic acid groups of the copolymer or terpolymer includes a sodium ion, a potassium ion, a lithium ion, a magnesium ion, a calcium ion, a zinc ion, barium ion, an aluminum, a tin ion, a zirconium ion, a cadmium ion, a neodymium ion and the like. Preferred are sodium ions, zinc ions, lithium ions, magnesium ions and the like, in view of rebound characteristics, durability and the like.

The ionomer resin is not limited, but examples thereof will be shown by a trade name thereof. Examples of the ionomer resins, which are commercially available from Du Pont-Mitsui Polychemicals Co., Ltd. include Hi-milan 1555, Hi-milan 1557, Hi-milan 1601, Hi-milan 1605, Hi-milan 1652, Hi-milan 1705, Hi-milan 1706, Hi-milan 1707, Hi-milan 1855, Hi-milan 1856 and the like. Examples of the ionomer resins, which are commercially available from Du Pont Co., include Surlyn 8945, Surlyn 9945, Surlyn 6320, Surlyn 8320, Surlyn 9320 and the like. Examples of the ionomer resins, which are commercially available from Exxon Chemical Co., include Iotek 7010, Iotek 8000 and the like. These ionomer resins may be used alone or in combination.

In the golf ball of the present invention, it is desired for a base resin of the intermediate layer to contain a combination of at least one of the above thermoplastic elastomer and at least one of the above ionomer resin. As the amount of both the thermoplastic elastomer and at least one of the ionomer resin, it is desired for a weight ratio of the thermoplastic elastomer to the ionomer resin to be within the range of 20/80 to 70/30, preferably 20/80 to 65/35, more preferably 20/80 to 50/50. When the amount of the thermoplastic elastomer is smaller than 20 parts by weight, based on 100 parts by weight of the base resin for the intermediate layer, the technical effects of improving shot feel accomplished by the presence of the thermoplastic elastomer are not sufficiently obtained. On the other hand, when the amount of the thermoplastic elastomer is larger than 70 parts by weight and the amount of the ionomer resin is smaller than 30 parts by weight, the intermediate layer is too soft, and the rebound characteristics are degraded, which reduces the flight distance. In addition, the durability is degraded.

In the golf ball of the present invention, the resin composition for the intermediate layer 2, which has a specific gravity of 0.90 to 1.25, may optionally contain a filler and the like in addition to the base resin. Examples of the fillers include inorganic filler (such as zinc oxide, barium sulfate, calcium carbonate and the like), high specific gravity metal powder filler (such as tungsten powder, molybdenum powder and the like), and the mixture thereof.

The intermediate layer 2 of the present invention may be formed by conventional methods, which have been known to the art and used for forming the cover of the golf balls. For example, there can be used a method comprising molding the intermediate layer composition into a semi-spherical half-shell, then covering the center with the two half-shells, followed by pressure molding, or a method comprising injection molding the composition for the intermediate layer directly on the center to cover it.

In the golf ball of the present invention, it is required for the intermediate layer 2 to have a hardness ($H_M$) in Shore D hardness of 36 to 50, preferably 36 to 49, more preferably 37 to 49. When the hardness is lower than 36, the rebound characteristics of the resulting golf ball are degraded and the launch angle is low, and the flight performance is degraded. In addition, the shot feel is heavy and poor. On the other hand, when the hardness is higher than 50, the intermediate layer is too hard, and the shot feel of the resulting golf ball is hard and poor.

In the golf ball of the present invention, it is required that the surface hardness of the center ($H_S$) be higher than the hardness of the intermediate layer ($H_M$) by 0 to 15, preferably 0 to 14, more preferably 0 to 13. When the hardness difference ($H_S-H_M$) is smaller than 0, that is, the $H_M$ is higher than the $H_S$, the shot feel of the resulting golf ball is hard and poor. On the other hand, when the hardness difference is larger than 15, the rebound characteristics are degraded, which reduces the flight distance. In addition, the launch angle is low and the spin amount is large, which reduces the flight distance.

In the golf ball of the present invention, it is desired for the intermediate layer 2 to have a thickness of 1.0 to 2.1 mm, preferably 1.1 to 1.8 mm, more preferably 1.1 to 1.7 mm. When the thickness of the intermediate layer is smaller than 1.0 mm, the technical effects accomplished by the presence of the intermediate layer are not sufficiently obtained, and the deformation amount of the resulting golf ball is small. Therefore, the launch angle is small, which degrades the flight performance, or the shot feel is poor. In addition, it is difficult to injection mold, the productivity is degraded. On the other hand, when the thickness is larger than 2.1 mm, the technical effects accomplished by the presence of the center are not sufficiently obtained, and the rebound characteristics are degraded, which degrades the flight performance. In addition, the shot feel is hard and poor. The cover 3 is then formed on the intermediate layer 2.

In the golf ball of the present invention, the cover 3 may comprises thermoplastic resins, such as particularly the ionomer resin, which is the same as used for the intermediate layer 2, or mixtures thereof. As the materials suitably used in the cover 3 of the present invention, the above ionomer resin may be used alone, but the ionomer resin may be used in combination with at least one of the thermoplastic elastomers, which are the same as used in the intermediate layer 2.

In the golf ball of the present invention, the cover composition may optionally contain fillers such as barium sulfate, pigments such as titanium dioxide, and other additives (such as a dispersant, an antioxidant, a UV absorber, a photostabilizer and a fluorescent agent or a fluorescent brightener, etc.), in addition to the resin component as a main component, as long as the addition of the additive does not deteriorate the desired performance of the golf ball cover. If used, the amount of the pigment is preferably 0.1 to 5.0 parts by weight, based on the 100 parts by weight of the base resin of the cover.

In the golf ball of the present invention, the cover 3 may be formed by the same methods as used in the intermediate layer 2. In the golf ball of the present invention, it is desired for the cover 3 to have a thickness of 1.0 to 2.5 mm, preferably 1.1 to 2.5 mm, more preferably 1.1 to 2.4 mm. When the thickness of the cover is smaller than 1.0 mm, the technical effects accomplished by the presence of the cover are not sufficiently obtained, and the rebound characteristics are degraded, which degrades the flight performance, or the durability is poor. In addition, it is difficult to injection mold, and the productivity is degraded. On the other hand, when the thickness is larger than 2.5 mm, the technical effects accomplished by the presence of the center and intermediate layer are not sufficiently obtained, and the resulting golf ball is too hard, which degrades the shot feel.

In the golf ball of the present invention, it is desired that the thickness of the cover be not less than that of the intermediate layer. When the thickness of the cover is smaller than that of the intermediate layer, the durability of the resulting golf ball is poor.

In the golf ball of the present invention, it is required for the hardness of the cover ($H_L$) to be higher than the hardness of the intermediate layer ($H_M$) by 10 to 28, and the hardness difference ($H_L-H_M$) is within the range of preferably 11 to 28, more preferably 12 to 28. When the hardness difference ($H_L-H_M$) is smaller than 10, the shot feel of the resulting golf ball is hard and poor. On the other hand, when the hardness difference is larger than 28, the durability of the resulting golf ball is poor.

In the golf ball of the present invention, it is required for the cover 3 to have a hardness ($H_L$) in Shore D hardness of 58 to 69, preferably 58 to 68, more preferably 58 to 66. When the hardness is lower than 58, the rebound characteristics of the resulting golf ball are degraded, the launch angle is low and the spin amount is large, which degrades the flight performance. In addition, the shot feel is heavy and poor. On the other hand, when the hardness is higher than 69, the cover is too hard, and the shot feel of the resulting golf ball is hard and poor. The term "a hardness of the intermediate layer and cover" as used herein refers to the hardness, which is determined by measuring a hardness using a sample of a stack of the three or more heat and press molded sheets having a thickness of about 2 mm from the intermediate layer composition and cover composition, which had been stored at 23° C. for 2 weeks.

At the time of molding the cover, many depressions called "dimples" are formed on the surface of the golf ball. In the golf ball of the present invention, it is required that assuming that the total of a periphery length of the dimple (that is, a length of dimple edge) is represented by X (mm) and a ratio of the golf ball surface area occupied by the dimple to the total surface area of the golf ball is represented by Y,
the values of X and Y satisfy the correlation represented by the following formula (1):

$$X \leq 1930+3882Y \tag{1}$$

It can be accomplished to arrange as many dimples of type having large periphery length as possible by adjusting the value of X to the range such that it satisfies the formula (1), and to reduce a decrease of the velocity of the golf ball by reducing the drag of the golf ball with applying a backspin immediately after hitting, which improves the flight distance.

The term "an area of the dimple" as used herein refers to the area enclosed in the periphery (edge) of the dimple when observing the central point of the golf ball from infinity, which is the area of plane. When the dimple is circular, the area of the dimple S is determined by calculating from the following formula:

$$S=\pi(d/2)^2$$

wherein d is a diameter of the dimple. The ratio of the golf ball surface occupied by the dimple to the total surface area of the golf ball (Y) is determined by calculating a ratio of (the total of the area S of each dimple) to (the surface area of the phantom sphere assuming that the golf ball is a true sphere having no dimples on the surface thereof).

The X value is preferably represented by the following formula:

$$X \leq 1789+3882Y,$$

more preferably represented by the following formula:

$$X \leq 1624+3882Y,$$

most preferably represented by the following formula:

$$X \leq 1444+3882Y,$$

particularly preferably represented by the following formula:

$$X \leq 1030+3882Y.$$

As the lower limit, the X value is preferably represented by the following formula:

$$X \geq 95+3882Y,$$

more preferably represented by the following formula:

$$X \geq 200+3882Y.$$

It is desired for the ratio of the golf ball surface occupied by the dimple to the total surface area of the golf ball (Y) to be within the range of 0.70 to 0.90, preferably 0.75 to 0.90, more preferably 0.75 to 0.88. When the Y value is smaller than 0.70, the trajectory of the hit golf ball is low, which reduces the flight distance. On the other hand, when the Y value is larger than 0.90, the hit golf ball creates blown-up trajectory, which reduces the flight distance.

It is desired for the number of the dimples having a periphery length of not less than 10.5 mm to be larger than 90%, preferably 91 to 100%, based on the total number of the dimples. When the number of the dimples is not more than 90%, the drag coefficient immediately after hitting is large, which reduces the flight distance. It is desired for the dimple to have a total number of 200 to 500, preferably 250 to 400. When the total number of the dimples is smaller than 200, it is difficult for the golf ball to have approximately spherical shape while maintaining the Y value described above, that is, it is difficult to maintain smoothness of the surface of the golf ball. On the other hand, when the total number of the dimples is larger than 500, it is difficult to satisfy the formula (1).

Figure 2:
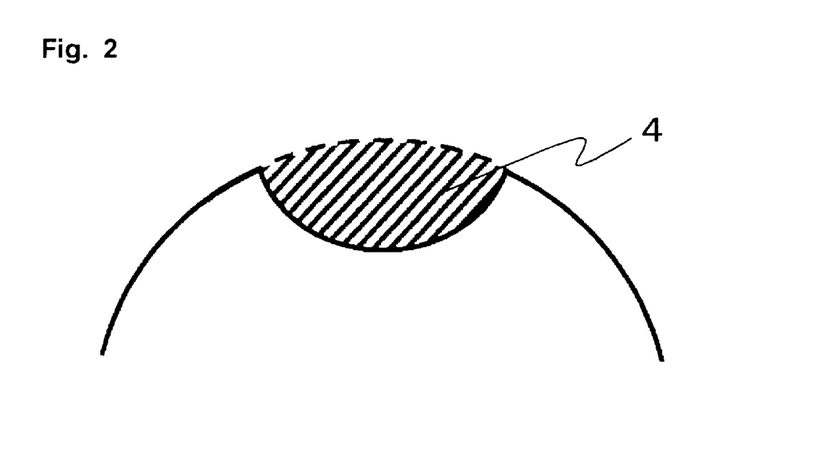
FIG. 2 is a schematic cross section of a dimple of the golf ball of the present invention using for explaining the method of measuring a total volume of the dimples.

The term "volume of the dimple" refers to a volume of a space enclosed by a concave of the dimple and the surface of the phantom sphere assuming that the golf ball is a true sphere having no dimples on the surface thereof as shown in FIG. 2. It is desired for the dimple to have a total volume of 300 to 700 mm$^3$, preferably 350 to 600 mm$^3$. When the total volume of the dimple is smaller than 300 mm$^3$, the hit golf ball creates blown-up trajectory, which reduces the flight distance. On the other hand, when the total dimple volume is larger than 700 mm$^3$, the trajectory of the resulting golf ball is too low and easy to drop, which reduces the flight distance.

The size of the dimple is not limited, but, if it is circular, it is desired for the dimple to have a diameter of 2.0 to 8.0 mm, preferably 3.0 to 7.0 mm. When the diameter of the dimple is smaller than 2.0 mm, an area of an opening of the dimple is too small, and the technical effects accomplished by the presence of the dimple are not sufficiently obtained. On the other hand, when the diameter of the dimple is larger than 8.0 mm, a number of the dimple arranged on the surface of the golf ball is small, and the technical effects accomplished by the presence of the dimple are not sufficiently obtained. It is desired for the dimples to be of not less than 2 types, preferably 2 to 5 types, which have different diameter. When the dimples are of one type, that is, the dimples have all the same diameter, it is difficult to disturb an airflow around the golf ball on the fly, which degrades its flight performance. In the golf ball of the present invention, the dimple may be circular or non-circular. When the dimple is circular, it may be single radius or double radius, or combination thereof. On the other hand, when the dimple is non-circular, it may be polygonal, star, oval and the like.

The total volume of the dimple and the ratio of the golf ball surface occupied by the dimple as used herein are determined by measuring at the surface of the resulting golf ball, and if paint is applied on the cover, they are determined by measuring at the surface of the applied golf ball. The term "a ratio of the golf ball surface occupied by the dimple" refers to a ratio of (the sum of an area of the plane enclosed in the periphery (edge) of each dimple) to (the surface area of the golf ball) assuming that the golf ball is a true sphere having no dimples on the surface thereof. The term "total volume of the dimple" refers to the sum of a volume of a space enclosed by a concave of the dimple and the surface of the phantom sphere assuming that the golf ball is a true sphere having no dimples on the surface thereof, that is, the sum of a volume of a dimple space corresponding to the portion removed from the golf ball by arranging the dimple on the surface of the golf ball.

In the golf ball of the present invention, furthermore, paint finishing or marking with a stamp may be optionally provided after the cover is molded for commercial purposes. The golf ball of the present invention is formed to a diameter of at least 42.67 mm (preferably 42.67 to 42.82 mm) and a weight of not more than 45.93 g, in accordance with the regulations for golf balls.

The diameter of golf balls is limited to not less than 42.67 mm in accordance with the regulations for golf balls as described above. Generally, when the diameter of the golf ball is large, air resistance of the golf ball on a flight is large, which reduces the flight distance. Therefore, most of golf balls commercially available are designed to have a diameter of 42.67 to 42.82 mm. The present invention is applicable to the golf balls having the diameter. There are golf balls having large diameter in order to improve the easiness of hitting. In addition, there are cases where golf balls having a diameter out of the regulations for golf balls are required depending on the demand and object of users. Therefore, it can be considered for golf balls to have a diameter of 42 to 44 mm, more widely 40 to 45 mm. The present invention is also applicable to the golf balls having the diameter.

EXAMPLES

The following Examples and Comparative Examples further illustrate the present invention in detail but are not to be construed to limit the scope of the present invention.

Production of Center

The rubber compositions for the center having the formulation shown in Tables 1 and 2 (Examples) and Tables 3 and 4 (Comparative Examples) were mixed with a mixing roll, and then vulcanized by press-molding in the mold at the vulcanization condition shown in the same Tables to obtain spherical centers. The diameter, deformation amount and hardness distribution (a central point hardness, a hardness at the distance of 5, 10 and 15 mm from the central point, and a surface hardness $H_S$) of the resulting centers were measured. The results are shown in Tables 9 and 10 (Examples) and Tables 11 and 12 (Comparative Examples). The difference between the maximum hardness and minimum hardness from the central point to the surface of the center was determined by calculating from the above values of the hardness, and the result is shown as a maximum hardness difference in the same Tables. The test methods are described later.

TABLE 1

(parts by weight)

| | | Example No. | | | | |
|---|---|---|---|---|---|---|
| | | 1 | 2 | 3 | 4 | 5 |
| (Center composition) | | | | | | |
| BR01 *1 | | 100 | 100 | 100 | 100 | 100 |
| Zinc acrylate | | 24.0 | 26.5 | 23.0 | 25.0 | 30.0 |
| Zinc oxide | | 28.2 | 27.8 | 29.0 | 30.5 | 22.2 |
| Dicumyl peroxide | | 0.6 | 0.5 | 0.5 | 0.8 | 0.5 |
| Diphenyl disulfide | | 0.5 | 0.5 | 0.6 | 0.5 | 0.5 |
| Vulcanization condition | | | | | | |
| The first | Temp (° C.) | 142 | 140 | 142 | 142 | 145 |
| stage | Time (min) | 30 | 31 | 28 | 30 | 25 |
| The second | Temp (° C.) | 165 | 164 | 165 | 170 | 165 |
| stage | Time (min) | 10 | 8 | 8 | 10 | 10 |

TABLE 2

(parts by weight)

| | | Example No. | | | | |
|---|---|---|---|---|---|---|
| | | 6 | 7 | 8 | 9 | 10 |
| (Center composition) | | | | | | |
| BR01 *1 | | 100 | 100 | 100 | 100 | 100 |
| Zinc acrylate | | 21.0 | 24.0 | 24.0 | 24.0 | 24.0 |
| Zinc oxide | | 30.6 | 28.2 | 28.2 | 28.2 | 28.2 |
| Dicumyl peroxide | | 0.5 | 0.6 | 0.6 | 0.6 | 0.6 |
| Diphenyl disulfide | | 0.5 | 0.5 | 0.5 | 0.5 | 0.5 |
| Vulcanization condition | | | | | | |
| The first | Temp (° C.) | 142 | 142 | 142 | 142 | 142 |
| stage | Time (min) | 30 | 30 | 30 | 30 | 30 |
| The second | Temp (° C.) | 165 | 165 | 165 | 165 | 165 |
| stage | Time (min) | 8 | 10 | 10 | 10 | 10 |

TABLE 3

(parts by weight)

| | Comparative Example No. | | | | |
|---|---|---|---|---|---|
| | 1 | 2 | 3 | 4 | 5 |
| (Center composition) | | | | | |
| BR01 *1 | 100 | 100 | 100 | 100 | 100 |
| Zinc acrylate | 29 | 29 | 24 | 24 | 27 |
| Zinc oxide | 22 | 22 | 29 | 28 | 28 |
| Dicumyl peroxide | 0.5 | 0.5 | 0.6 | 0.6 | 0.5 |
| Diphenyl disulfide | 0.5 | 0.5 | 1.0 | 0.5 | 0.6 |
| Antioxidant *2 | — | — | — | — | — |
| Vulcanization condition | | | | | |
| The first stage Temp (° C.) | 144 | 144 | 144 | 158 | 142 |
| The first stage Time (min) | 23 | 23 | 20 | 30 | 28 |
| The second stage Temp (° C.) | 165 | 165 | 165 | — | 165 |
| The second stage Time (min) | 8 | 8 | 8 | — | 8 |

TABLE 4

(parts by weight)

| | Comparative Example No. | | | |
|---|---|---|---|---|
| | 6 | 7 | 8 | 9 |
| (Center composition) | | | | |
| BR01 *1 | 100 | 100 | 100 | 100 |
| Zinc acrylate | 24 | 25 | 24.0 | 24.0 |
| Zinc oxide | 28 | 26 | 28.2 | 28.2 |
| Dicumyl peroxide | 0.6 | 0.65 | 0.6 | 0.6 |
| Diphenyl disulfide | 0.5 | — | 0.5 | 0.5 |
| Antioxidant *2 | — | 0.2 | — | — |
| Vulcanization condition | | | | |
| The first stage Temp (° C.) | 142 | 155 | 142 | 142 |
| The first stage Time (min) | 30 | 15 | 30 | 30 |
| The second stage Temp (° C.) | 165 | — | 165 | 165 |
| The second stage Time (min) | 10 | — | 10 | 10 |

*1: BR-01 (trade name), high-cis polybutadiene commercially available from JSR Co., Ltd.
*2: Antioxidant (trade name "Yoshinox 425") commercially available from Yoshitomi Pharmaceutical Industries, Ltd.

Preparation of Intermediate Layer Compositions and Cover Compositions

The formulation materials for the intermediate layer and cover shown in Tables 5 and 6 (Examples) and Tables 7 and 8 (Comparative Examples) were mixed using a kneading type twin-screw extruder to obtain pelletized intermediate layer compositions and cover compositions. The extrusion condition was,
  a screw diameter of 45 mm,
  a screw speed of 200 rpm, and
  a screw L/D of 35.
The formulation materials were heated at 200 to 260° C. at the die position of the extruder. The hardness for the intermediate layer ($H_M$) and hardness of the cover ($H_L$) were measured, using a sample of a stack of the three or more heat and press molded sheets having a thickness of about 2 mm from the resulting compositions for the intermediate layer and cover, which had been stored at 23° C. for 2 weeks, and the hardness differences ($H_S-H_M$) and ($H_L-H_M$) were determined by calculation. The results are shown in Tables 9 and 10 (Examples) and Tables 11 and 12 (Comparative Examples). The test methods are described later.

TABLE 5

(parts by weight)

| | Example No. | | | | |
|---|---|---|---|---|---|
| | 1 | 2 | 3 | 4 | 5 |
| (Intermediate layer composition) | | | | | |
| Surlyn 8945 *3 | 26 | 26 | 26 | 32 | 20 |
| Surlyn 9945 *4 | 26 | 26 | 26 | 32 | 20 |
| Hytrel 4047 *5 | — | — | — | — | — |
| Rabalon SR04 *6 | 48 | 48 | 48 | 36 | 60 |
| Elastollan ET880 *7 | — | — | — | — | — |
| (Cover composition) | | | | | |
| Surlyn 8945 *3 | — | — | — | — | — |
| Surlyn 9945 *4 | 40 | 40 | 40 | 40 | 40 |
| Hi-milan 1605 *8 | 60 | 60 | 50 | 50 | 60 |
| Hi-milan 1706 *9 | — | — | — | — | — |
| Hi-milan 1855 *10 | — | — | — | — | — |
| Rabalon SR04 *6 | — | — | 10 | 10 | — |
| Titanium dioxide | 2 | 2 | 2 | 2 | 2 |

TABLE 6

(parts by weight)

| | Example No. | | | | |
|---|---|---|---|---|---|
| | 6 | 7 | 8 | 9 | 10 |
| (Intermediate layer composition) | | | | | |
| Surlyn 8945 *3 | 20 | 26 | 26 | 26 | 26 |
| Surlyn 9945 *4 | 20 | 26 | 26 | 26 | 26 |
| Hytrel 4047 *5 | — | — | — | — | — |
| Rabalon SR04 *6 | 60 | 48 | 48 | 48 | 48 |
| Elastollan ET880 *7 | — | — | — | — | — |
| (Cover composition) | | | | | |
| Surlyn 8945 *3 | 40 | — | — | — | — |
| Surlyn 9945 *4 | 40 | 40 | 40 | 40 | 40 |
| Hi-milan 1605 *8 | 12 | 60 | 60 | 60 | 60 |
| Hi-milan 1706 *9 | — | — | — | — | — |
| Hi-milan 1855 *10 | — | — | — | — | — |
| Rabalon SR04 *6 | 8 | — | — | — | — |
| Titanium dioxide | 2 | 2 | 2 | 2 | 2 |

TABLE 7

(parts by weight)

| | Comparative Example No. | | | | |
|---|---|---|---|---|---|
| | 1 | 2 | 3 | 4 | 5 |
| (Intermediate layer composition) | | | | | |
| Surlyn 8945 *3 | — | — | 35 | 26 | 32 |
| Surlyn 9945 *4 | — | — | 35 | 26 | 32 |
| Hytrel 4047 *5 | — | — | 30 | — | — |
| Rabalon SR04 *6 | — | — | — | 48 | 36 |
| Elastollan ET880 *7 | 100 | 100 | — | — | — |
| (Cover composition) | | | | | |
| Surlyn 8945 *3 | — | — | — | — | — |
| Surlyn 9945 *4 | 40 | 40 | 40 | 40 | 40 |
| Hi-milan 1605 *8 | 50 | 60 | 60 | 60 | 60 |
| Hi-milan 1706 *9 | — | — | — | — | — |
| Hi-milan 1855 *10 | — | — | — | — | — |
| Rabalon SR04 *6 | 10 | — | — | — | — |
| Titanium dioxide | 2 | 2 | 2 | 2 | 2 |

TABLE 8

(parts by weight)

| | Comparative Example No. | | | |
|---|---|---|---|---|
| | 6 | 7 | 8 | 9 |
| (Intermediate layer composition) | | | | |
| Surlyn 8945 *3 | 26 | — | 26 | 26 |
| Surlyn 9945 *4 | 26 | — | 26 | 26 |
| Hytrel 4047 *5 | — | 100 | — | — |
| Rabalon SR04 *6 | 48 | — | 48 | 48 |
| Elastollan ET880 *7 | — | — | — | — |
| (Cover composition) | | | | |
| Surlyn 8945 *3 | 10 | — | — | — |
| Surlyn 9945 *4 | — | — | 40 | 40 |
| Hi-milan 1605 *8 | — | 50 | 60 | 60 |
| Hi-milan 1706 *9 | — | 50 | — | — |
| Hi-milan 1855 *10 | 90 | — | — | — |
| Rabalon SR04 *6 | — | — | — | — |
| Titanium dioxide | 2 | — | 2 | 2 |

*3: Surlyn 8945 (trade name), ethylene-methacrylic acid copolymer ionomer resin obtained by neutralizing with sodium ion, manufactured by Du Pont Co.
*4: Surlyn 9945 (trade name), ethylene-methacrylic acid copolymer ionomer resin obtained by neutralizing with zinc ion, manufactured by Du Pont Co.
*5: Hytrel 4047 (trade name), polyester-based thermoplastic elastomer, which is commercially available from Toray-Do Pont Co., Ltd.
*6: Rabalon SR04 (trade name), styrene-based thermoplastic elastomer, manufactured by Mitsubishi Chemical Co., Ltd.
*7: Elastollan ET880 (trade name), polyurethane-based thermoplastic elastomer, manufactured by BASF Polyurethane Elastomers Ltd.
*8: Hi-milan 1605 (trade name), ethylene-methacrylic acid copolymer ionomer resin obtained by neutralizing with sodium ion, manufactured by Mitsui Du Pont Polychemical Co., Ltd.
*9: Hi-milan 1706 (trade name), ethylene-methacrylic acid copolymer ionomer resin obtained by neutralizing with zinc ion, manufactured by Mitsui Du Pont Polychemical Co., Ltd.
*10: Hi-milan 1855 (trade name), ethylene-methacrylic acid-acrylic acid ester terpolymer ionomer resin obtained by neutralizing with zinc ion, manufactured by Mitsui Du Pont Polychemical Co., Ltd.

Formation of Intermediate Layer

The intermediate layer compositions were covered on the resulting center by directly injection molding to form an intermediate layer having a thickness shown in Tables 9 and 10 (Examples) and Tables 11 and 12 (Comparative Examples).

Examples 1 to 10 and Comparative Examples 1 to 9

The cover compositions were covered on the resulting intermediate layer by injection molding using a mold having dimples to form a cover having a thickness shown in Tables 9 and 10 (Examples) and Tables 11 and 12 (Comparative Examples). Then, paint was applied on the surface to obtain golf ball having a diameter of 42.8 mm and weight of 45.3 g. With respect to the resulting golf balls, the flight performance (the launch angle, spin amount and flight distance) were measured, and the shot feel at the time of hitting were evaluated. The results are shown in Tables 13 and 14 (Examples) and Tables 15 and 16 (Comparative Examples). With respect to the resulting golf balls, the properties of dimple (the diameter, number, periphery length × (total periphery length X), ratio of the golf ball surface area occupied by the dimple to the total surface area of the golf ball Y and value of (X−3882Y)) were measured. The results are shown in Tables 17 (Examples) and Table 18 (Comparative Examples). The test methods are as follows.

(Test methods)
(1) Hardness
(i) Hardness of Center

The surface hardness of the center ($H_S$) was determined by measuring a Shore D hardness at the surface of the resulting center. The central point hardness, the hardness at the distance of 5, 10 and 15 mm from the central point of the center were determined by cutting the resulting center into two equal parts and then measuring a Shore D hardness at its center point and the distance of 5, 10 and 15 mm from the central point in section. The difference between the maximum hardness and minimum hardness from the central point to the surface of the center was determined by calculation. The results are shown as the maximum hardness difference of the center. The Shore D hardness was measured using a Shore D hardness meter according to ASTM D 2240.

(ii) Hardness of Intermediate Layer and Cover

The hardness of the intermediate layer and cover were determined by measuring a hardness (slab hardness), using a sample of a stack of the three or more heat and press molded sheets having a thickness of about 2 mm from the intermediate layer composition and cover composition, which had been stored at 23° C. for 2 weeks, with a Shore D hardness meter according to ASTM D 2240.

(2) Deformation Amount of Center

The deformation amount of the center was determined by measuring a deformation amount when applying from an initial load of 98 N to a final load of 1275 N on the center.

(3) Properties of Dimple
(i) Ratio of Golf Ball Surface Occupied

The ratio of the golf ball surface occupied by the dimple was determined by obtaining a ratio of (the sum of an area of a plane enclosed in the periphery (edge) of each dimple) to (the surface area of the golf ball assuming that the golf ball is a true sphere having no dimples on the surface thereof).

(ii) Total Volume of Dimple

The total volume of the dimple is the sum of a volume of each dimple. The volume of each dimple is a volume of a space (4) enclosed by a concave of the dimple and the surface of the phantom sphere assuming that the golf ball is a true sphere having no dimples on the surface thereof, that is, a space corresponding to the portion removed from the golf ball by arranging the dimple on the surface of the golf ball, as described in FIG. 2. The volume of the dimple is determined by measuring a dimple shape in section using a profile meter, and calculating from the shape.

(4) Flight Performance
(i) Flight Performance 1

After a No. 1 wood club (W#1, a driver) having a metal head was mounted to a swing robot manufactured by True Temper Co. and the golf ball was hit at a head speed of 35 m/sec, the launch angle, spin amount (backspin amount) and flight distance were measured. As the flight distance, total that is a distance to the stop point of the hit golf ball was measured. The measurement was conducted 5 times for each golf ball (n=5), and the average is shown as the result of the golf ball.

(ii) Flight Performance 2

After a No. 1 wood club (W#1, a driver) was mounted to a swing robot manufactured by True Temper Co. and the golf ball was hit at a head speed of 40 m/sec, the launch angle, spin amount (backspin amount) and flight distance were measured. As the flight distance, total that is a distance to the stop point of the hit golf ball was measured. The measurement was conducted 5 times for each golf ball (n=5), and the average is shown as the result of the golf ball.

(5) Shot Feel

The shot feel of the golf ball is evaluated by 10 golfers who swing a golf club at a head speed of 33 to 40 m/sec according to a practical hitting test using a No. 1 wood club (W#1, a driver) having a metal head. The results shown in the Tables below are based on the fact that the most golfers evaluated with the same criterion about shot feel. The evaluation criteria are as follows.

Evaluation Criteria (Rebound Characteristics)

- ○: The golfers felt that the golf ball has good shot feel such that the rebound characteristics are good.
- Δ: The golfers felt that the golf ball has good shot feel such that the rebound characteristics are good, but the shot feel is hard and poor.
- x: The golfers felt that the golf ball has poor shot feel such that the rebound characteristics are poor.

(6) Durability

A No. 1 wood club (W#1, a driver) having metal head was mounted to a swing robot manufactured by True Temper Co. and the resulting golf ball was hit at a head speed of 45 m/sec to strike against an impact board, repeatedly. The durability is determined by measuring the number of hit until the cover of the golf ball cracks, and is expressed as an index, with the value of the index in Example 1 being taken as 100. The larger the value is, the better durability the golf ball has.

(Test Results)

TABLE 9

| Test item | Example No. | | | | |
|---|---|---|---|---|---|
| | 1 | 2 | 3 | 4 | 5 |
| (Center) | | | | | |
| Diameter (mm) | 37.0 | 37.0 | 37.0 | 36.4 | 34.4 |
| Deformation amount (mm) | 4.5 | 3.7 | 4.9 | 4.0 | 3.5 |
| Shore D hardness | | | | | |
| Central point | 38.0 | 39.0 | 31.5 | 40.5 | 42.5 |
| 5 mm from central point | 38.0 | 40.0 | 33.5 | 42.0 | 43.5 |
| 10 mm from central point | 39.0 | 40.5 | 35.0 | 44.0 | 45.0 |
| 15 mm from central point | 39.0 | 42.0 | 36.5 | 45.0 | 47.5 |
| Surface hardness $H_S$ | 40.0 | 43.0 | 38.0 | 47.0 | 49.0 |
| Maximum difference | 2.0 | 4.0 | 6.5 | 6.5 | 6.5 |
| (Intermediate layer) | | | | | |
| Thickness (mm) | 1.3 | 1.3 | 1.3 | 1.6 | 1.9 |
| Hardness $H_M$ (Shore D) | 38 | 38 | 38 | 47 | 36 |
| Difference ($H_S - H_M$) | 2 | 5 | 0 | 0 | 13 |
| (Cover) | | | | | |
| Thickness (mm) | 1.6 | 1.6 | 1.6 | 1.6 | 2.3 |
| Hardness $H_L$ (Shore D) | 64 | 64 | 58 | 58 | 64 |
| Difference ($H_L - H_M$) | 26 | 26 | 20 | 11 | 28 |

TABLE 10

| Test item | Example No. | | | | |
|---|---|---|---|---|---|
| | 6 | 7 | 8 | 9 | 10 |
| (Center) | | | | | |
| Diameter (mm) | 36.4 | 37.0 | 37.0 | 37.0 | 37.0 |
| Deformation amount (mm) | 5.3 | 4.5 | 4.5 | 4.5 | 4.5 |
| Shore D hardness | | | | | |
| Central point | 33.0 | 38.0 | 38.0 | 38.0 | 38.0 |
| 5 mm from central point | 34.0 | 38.0 | 38.0 | 38.0 | 38.0 |
| 10 mm from central point | 34.0 | 39.0 | 39.0 | 39.0 | 39.0 |
| 15 mm from central point | 35.0 | 39.0 | 39.0 | 39.0 | 39.0 |
| Surface hardness $H_S$ | 36.0 | 40.0 | 40.0 | 40.0 | 40.0 |

TABLE 10-continued

| Test item | Example No. | | | | |
|---|---|---|---|---|---|
| | 6 | 7 | 8 | 9 | 10 |
| Maximum difference | 3.0 | 2.0 | 2.0 | 2.0 | 2.0 |
| (Intermediate layer) | | | | | |
| Thickness (mm) | 1.6 | 1.3 | 1.3 | 1.3 | 1.3 |
| Hardness $H_M$ (Shore D) | 36 | 38 | 38 | 38 | 38 |
| Difference ($H_S - H_M$) | 0 | 2 | 2 | 2 | 2 |
| (Cover) | | | | | |
| Thickness (mm) | 1.6 | 1.6 | 1.6 | 1.6 | 1.6 |
| Hardness $H_L$ (Shore D) | 59 | 64 | 64 | 64 | 64 |
| Difference ($H_L - H_M$) | 23 | 26 | 26 | 26 | 26 |

TABLE 11

| Test item | Comparative Example No. | | | | |
|---|---|---|---|---|---|
| | 1 | 2 | 3 | 4 | 5 |
| (Center) | | | | | |
| Diameter (mm) | 37.0 | 37.0 | 37.0 | 37.0 | 37.0 |
| Deformation amount (mm) | 3.5 | 3.5 | 5.4 | 4.8 | 3.9 |
| Shore D hardness | | | | | |
| Central point | 48.5 | 48.5 | 34.0 | 36.0 | 38.0 |
| 5 mm from central point | 49.0 | 49.0 | 36.0 | 41.0 | 38.5 |
| 10 mm from central point | 50.0 | 50.0 | 36.5 | 44.5 | 39.5 |
| 15 mm from central point | 50.0 | 50.0 | 38.0 | 46.5 | 41.0 |
| Surface hardness $H_S$ | 51.0 | 51.0 | 39.0 | 48.0 | 43.0 |
| Maximum difference | 2.5 | 2.5 | 5.0 | 12.0 | 5.0 |
| (Intermediate layer) | | | | | |
| Thickness (mm) | 1.3 | 1.3 | 1.3 | 1.3 | 1.3 |
| Hardness $H_M$ (Shore D) | 30 | 30 | 56 | 38 | 47 |
| Difference ($H_S - H_M$) | 21 | 21 | −17 | 10 | −4 |
| (Cover) | | | | | |
| Thickness (mm) | 1.6 | 1.6 | 1.6 | 1.6 | 1.6 |
| Hardness $H_L$ (Shore D) | 58 | 64 | 64 | 64 | 64 |
| Difference ($H_L - H_M$) | 28 | 34 | 8 | 26 | 17 |

TABLE 12

| Test item | Comparative Example No. | | | |
|---|---|---|---|---|
| | 6 | 7 | 8 | 9 |
| (Center) | | | | |
| Diameter (mm) | 37.0 | 35.24 | 37.0 | 37.0 |
| Deformation amount (mm) | 4.5 | 4.2 | 4.5 | 4.5 |
| Shore D hardness | | | | |
| Central point | 38.0 | 34.0 | 38.0 | 38.0 |
| 5 mm from central point | 38.0 | 38.0 | 38.0 | 38.0 |
| 10 mm from central point | 39.0 | 40.0 | 39.0 | 39.0 |
| 15 mm from central point | 39.0 | 43.0 | 39.0 | 39.0 |
| Surface hardness $H_S$ | 40.0 | 45.0 | 40.0 | 40.0 |
| Maximum difference | 2.0 | 11.0 | 2.0 | 2.0 |
| (Intermediate layer) | | | | |
| Thickness (mm) | 1.3 | 1.8 | 1.3 | 1.3 |
| Hardness $H_M$ (Shore D) | 38 | 40 | 38 | 38 |
| Difference ($H_S - H_M$) | 2 | 5 | 2 | 2 |
| (Cover) | | | | |
| Thickness (mm) | 1.6 | 1.9 | 1.6 | 1.6 |
| Hardness $H_L$ (Shore D) | 56 | 65 | 64 | 64 |
| Difference ($H_L - H_M$) | 18 | 25 | 26 | 26 |

TABLE 13

| Test item | Example No. | | | | |
|---|---|---|---|---|---|
| | 1 | 2 | 3 | 4 | 5 |
| (Properties of dimple) | | | | | |
| Type of dimples | (2) | (2) | (2) | (2) | (2) |
| Total number | 390 | 390 | 390 | 390 | 390 |
| Total volume (mm$^3$) | 500 | 500 | 500 | 500 | 500 |
| Ratio of golf ball surface occupied (%) | 78.0 | 78.0 | 78.0 | 78.0 | 78.0 |
| Y | 0.780 | 0.780 | 0.780 | 0.780 | 0.780 |
| X | 4652.1 | 4652.1 | 4652.1 | 4652.1 | 4652.1 |
| (X-3882Y) | 1624 | 1624 | 1624 | 1624 | 1624 |
| Flight performance 1 (W#1, 35 m/sec) | | | | | |
| Launch angle (degree) | 12.5 | 12.4 | 12.4 | 12.4 | 12.3 |
| Spin amount (rpm) | 2500 | 2600 | 2550 | 2550 | 2500 |
| Flight distance (m) | 173.5 | 173.0 | 173.0 | 172.5 | 173.0 |
| Flight performance 2 (W#1, 40 m/sec) | | | | | |
| Launch angle (degree) | 12.4 | 12.3 | 12.3 | 12.5 | 12.3 |
| Spin amount (rpm) | 2600 | 2700 | 2750 | 2550 | 2650 |
| Flight distance (m) | 207.0 | 205.5 | 205.0 | 207.0 | 205.0 |
| Shot feel | ○ | ○ | ○ | ○ | ○ |
| Durability | 100 | 105 | 110 | 118 | 112 |

TABLE 14

| Test item | Example No. | | | | |
|---|---|---|---|---|---|
| | 6 | 7 | 8 | 9 | 10 |
| (Properties of dimple) | | | | | |
| Type of dimples | (2) | (1) | (3) | (4) | (5) |
| Total number | 390 | 432 | 360 | 372 | 320 |
| Total volume (mm$^3$) | 500 | 500 | 500 | 500 | 500 |
| Ratio of golf ball surface occupied (%) | 78.0 | 79.6 | 78.6 | 85.3 | 81.7 |
| Y | 0.780 | 0.796 | 0.786 | 0.853 | 0.817 |
| X | 4652.1 | 4968.7 | 4495.6 | 4755.7 | 4202.0 |
| (X-3882Y) | 1624 | 1879 | 1444 | 1444 | 1050 |
| Flight performance 1 (W#1, 35 m/sec) | | | | | |
| Launch angle (degree) | 12.5 | 12.5 | 12.5 | 12.5 | 12.6 |
| Spin amount (rpm) | 2550 | 2500 | 2450 | 2450 | 2400 |
| Flight distance (m) | 173.0 | 173.0 | 174.0 | 174.0 | 174.5 |
| Flight performance 2 (W#1, 40 m/sec) | | | | | |
| Launch angle (degree) | 12.4 | 12.4 | 12.4 | 12.5 | 12.5 |
| Spin amount (rpm) | 2650 | 2600 | 2600 | 2550 | 2550 |
| Flight distance (m) | 207.0 | 206.0 | 207.5 | 207.5 | 208.0 |
| Shot feel | ○ | ○ | ○ | ○ | ○ |
| Durability | 102 | 100 | 100 | 100 | 100 |

TABLE 15

| Test item | Comparative Example No. | | | | |
|---|---|---|---|---|---|
| | 1 | 2 | 3 | 4 | 5 |
| (Properties of dimple) | | | | | |
| Type of dimples | (2) | (2) | (2) | (2) | (2) |
| Total number | 390 | 390 | 390 | 390 | 390 |
| Total volume (mm$^3$) | 500 | 500 | 500 | 500 | 500 |
| Ratio of golf ball surface occupied (%) | 78.0 | 78.0 | 78.0 | 78.0 | 78.0 |
| Y | 0.780 | 0.780 | 0.780 | 0.780 | 0.780 |
| X | 4652.1 | 4652.1 | 4652.1 | 4652.1 | 4652.1 |
| (X-3882Y) | 1624 | 1624 | 1624 | 1624 | 1624 |
| Flight performance 1 (W#1, 35 m/sec) | | | | | |
| Launch angle (degree) | 11.9 | 12.0 | 12.4 | 12.4 | 12.2 |
| Spin amount (rpm) | 2800 | 2800 | 2550 | 2600 | 2750 |
| Flight distance (m) | 172.0 | 171.5 | 174.0 | 172.0 | 172.5 |

TABLE 15-continued

|  | Comparative Example No. | | | | |
|---|---|---|---|---|---|
| Test item | 1 | 2 | 3 | 4 | 5 |
| Flight performance 2 (W#1, 40 m/sec) | | | | | |
| Launch angle (degree) | 11.8 | 12.0 | 12.2 | 12.3 | 12.1 |
| Spin amount (rpm) | 2950 | 2900 | 2700 | 2600 | 2800 |
| Flight distance (m) | 202.0 | 204.5 | 206.0 | 204.0 | 205.5 |
| Shot feel | × | × | Δ | × | Δ |
| Durability | 102 | 97 | 93 | 94 | 95 |

TABLE 16

|  | Comparative Example No. | | | |
|---|---|---|---|---|
| Test item | 6 | 7 | 8 | 9 |
| (Properties of dimple) | | | | |
| Type of dimples | (2) | (2) | (6) | (7) |
| Total number | 390 | 390 | 480 | 492 |
| Total volume (mm³) | 500 | 500 | 500 | 500 |
| Ratio of golf ball surface occupied (%) | 78.0 | 78.0 | 79.3 | 75.8 |
| Y | 0.780 | 0.780 | 0.793 | 0.758 |
| X | 4652.1 | 4652.1 | 5221.3 | 5161.0 |
| (X−3882Y) | 1624 | 1624 | 2143 | 2218 |
| Flight performance 1 (W#1, 35 m/sec) | | | | |
| Launch angle (degree) | 11.8 | 12.1 | 12.5 | 12.5 |
| Spin amount (rpm) | 2950 | 2600 | 2500 | 2500 |
| Flight distance (m) | 170.5 | 171.5 | 168.0 | 167.5 |
| Flight performance 2 (W#1, 40 m/sec) | | | | |
| Launch angle (degree) | 12.2 | 12.1 | 12.4 | 12.4 |
| Spin amount (rpm) | 2950 | 2950 | 2600 | 2600 |
| Flight distance (m) | 203.0 | 204.0 | 201.5 | 201.0 |
| Shot feel | × | × | ○ | ○ |
| Durability | 112 | 90 | 100 | 100 |

TABLE 17

| Type of Dimple | d (mm) | n | N | Ratio of n (%) | x (mm) | X (mm) | Y | X−3882Y |
|---|---|---|---|---|---|---|---|---|
| (1) | 4.0 | 24 | 432 | 5.6 | 12.6 | 4968.7 | 0.796 | 1879 |
|  | 3.8 | 96 |  | 22.2 | 11.9 |  |  |  |
|  | 3.7 | 216 |  | 50.0 | 11.6 |  |  |  |
|  | 3.35 | 96 |  | 22.2 | 10.5 |  |  |  |
| (2) | 4.1 | 186 | 390 | 47.7 | 12.9 | 4652.1 | 0.780 | 1624 |
|  | 3.8 | 114 |  | 29.2 | 11.9 |  |  |  |
|  | 3.45 | 60 |  | 15.4 | 10.8 |  |  |  |
|  | 2.6 | 30 |  | 7.7 | 8.2 |  |  |  |
| (3) | 4.3 | 174 | 360 | 48.3 | 13.5 | 4495.6 | 0.786 | 1444 |
|  | 3.8 | 126 |  | 35.0 | 11.9 |  |  |  |
|  | 3.4 | 60 |  | 16.7 | 10.7 |  |  |  |
| (4) | 4.4 | 130 | 372 | 34.9 | 13.8 | 4755.7 | 0.853 | 1444 |
|  | 4.1 | 150 |  | 40.3 | 12.9 |  |  |  |
|  | 3.9 | 60 |  | 16.1 | 12.3 |  |  |  |
|  | 2.9 | 32 |  | 8.6 | 9.1 |  |  |  |
| (5) | 6.0 | 72 | 320 | 22.5 | 18.8 | 4202.0 | 0.817 | 1030 |
|  | 4.5 | 24 |  | 7.5 | 14.1 |  |  |  |
|  | 4.0 | 88 |  | 27.5 | 12.6 |  |  |  |
|  | 3.4 | 112 |  | 35.0 | 10.7 |  |  |  |
|  | 2.7 | 24 |  | 7.5 | 8.5 |  |  |  |

TABLE 18

| Type of Dimple | d (mm) | n | N | Ratio of n (%) | x (mm) | X (mm) | Y | X−3882Y |
|---|---|---|---|---|---|---|---|---|
| (6) | 3.8 | 60 | 480 | 12.5 | 11.9 | 5221.3 | 0.793 | 2143 |
|  | 3.6 | 180 |  | 37.5 | 11.3 |  |  |  |
|  | 3.4 | 180 |  | 37.5 | 10.7 |  |  |  |
|  | 2.9 | 60 |  | 12.5 | 9.1 |  |  |  |
| (7) | 3.8 | 60 | 492 | 12.2 | 11.9 | 5161.0 | 0.758 | 2218 |
|  | 3.6 | 60 |  | 12.2 | 11.3 |  |  |  |
|  | 3.4 | 240 |  | 48.8 | 10.7 |  |  |  |
|  | 2.9 | 132 |  | 26.8 | 9.1 |  |  |  | d: diameter of dimple
n: number of dimples
N: total number of dimples

As is apparent from the results of Tables 13 to 16, in the golf balls of the present invention of Examples 1 to 10, when compared with the golf balls of Comparative Examples 1 to 9, the flight distance can be improved by accomplishing high launch angle and low spin amount in initial flight performance, while maintaining good shot feel such that the rebound characteristics are good, when hit at low head speed.

On the other hand, in the golf balls of Comparative Examples 1 and 2, since the surface hardness of the center ($H_S$) is high, the hardness of the intermediate layer ($H_M$) is low and the hardness difference ($H_S-H_M$) is large, the launch angle is small and the spin amount is large, which reduces the flight distance. In addition, the shot feel is poor such that the rebound characteristics are poor.

In the golf ball of Comparative Example 3, since the hardness of the intermediate layer ($H_M$) is high and the hardness difference ($H_L-H_M$) is small, the shot feel is good such that the rebound characteristics are good, but the shot feel is hard and poor. In addition, the durability is poor. In the golf ball of Comparative Example 4, since the maximum hardness difference of the center is large, the shot feel is poor such that the rebound characteristics are poor. In addition, the durability is poor.

In the golf ball of Comparative Example 5, since the hardness of the intermediate layer is higher than the surface hardness of the center, the shot feel is good such that the rebound characteristics are poor, but the shot feel is hard and poor. In addition, the durability is poor. In the golf ball of Comparative Example 6, since the hardness of the cover is too low, the launch angle is small and the spin amount is large, which reduces the flight distance. In addition, the shot feel is poor such that the rebound characteristics are poor.

In the golf ball of Comparative Example 7, since the maximum hardness difference of the center is too large, the rebound characteristics are degraded, which reduces the flight distance. In addition, the amount of thermoplastic elastomer in the intermediate layer is too large and the amount of ionomer resin is too small, and the rebound characteristics are degraded, which reduces the flight distance. Furthermore, the shot feel is poor such that the rebound characteristics are poor, or the durability is poor.

In the golf balls of Examples 8 and 9, since the total of a periphery length of the dimple X and the ratio of the golf ball surface area occupied by the dimple to the total surface area of the golf ball Y do not satisfy the correlation represented by the formula (1), that is, the value of (X−3882Y) is large, the properties of the dimple are not optimized, and the flight distance is very short.

What is claimed is:

1. A three-piece solid golf ball comprising a center, an intermediate layer formed on the center and a cover covering the intermediate layer and having many dimples on the surface thereof, wherein the center has a maximum hardness difference in Shore D hardness from the central point to the surface of not more than 7 and a surface hardness ($H_S$) of 36 to 50, a base resin of the intermediate layer is formed from thermoplastic resin, and the intermediate layer has a hardness ($H_M$) in Shore D hardness of 36 to 50, a base resin of the cover is formed from thermoplastic resin, and the cover has a hardness ($H_L$) in Shore D hardness of 58 to 69, the surface hardness of the center ($H_S$) is higher than the hardness of the intermediate layer ($H_M$) by up to 15, and the hardness of the cover ($H_L$) is higher than the hardness of the intermediate layer ($H_M$) by 10 to 28, assuming that the total of a periphery length of the dimples is represented by X (mm) and a ratio of the golf ball surface area occupied by the dimples to the total surface area of the golf ball is represented by Y, the X and Y satisfy the correlation represented by the following formula (1)

$$X \leq 1930 + 3882Y \quad (1)$$

and Y is within the range of 0.70 to 0.90.

2. The three-piece solid golf ball according to claim 1, wherein the intermediate layer has a thickness of 1.0 to 2.1 mm, and the cover has a thickness of 1.0 to 2.1 mm.

3. The three-piece solid golf ball according to claim 1, wherein the thickness of the cover is not less than that of the intermediate layer.

4. The three-piece solid golf ball according to claim 1, wherein the number of dimples having a periphery length of not less than 10.5 mm is larger than 90%, based on the total number of dimples.

5. The three-piece solid golf ball according to claim 1, wherein the surface hardness of the center ($H_S$) is higher than the hardness of the intermediate layer ($H_M$) by 0 to 13, and the hardness of the cover ($H_L$) is higher than the hardness of the intermediate layer ($H_M$) by 12 to 28.

6. The three-piece solid golf ball according to claim 1, wherein X and Y satisfy the correlation represented by the following formula (1)

$$X \leq 1444 + 3882Y \quad (1)$$

and Y is within the range of 0.75 to 0.88.

7. The three-piece solid golf ball according to claim 1, wherein X and Y satisfy the correlation represented by the following formula:

$$X \geq 95 + 3882Y$$

and $$X \leq 1930 + 3882Y$$

8. The three-piece solid golf ball according to claim 1, wherein the center has a surface hardness ($H_S$) of 37 to 49.

9. The three-piece solid golf ball according to claim 1, wherein the intermediate layer has a hardness ($H_M$) of 37 to 49.

10. The three-piece solid golf ball according to claim 1, wherein the cover has a hardness ($H_L$) of 58 to 66.

11. A three-piece solid golf ball comprising a center, an intermediate layer formed on the center and a cover covering the intermediate layer and having many dimples on the surface thereof, wherein the center has a maximum hardness difference in Shore D hardness from the central point to the surface of not more than 7 and a surface hardness ($H_S$) of 36 to 50, a base resin of the intermediate layer is formed from thermoplastic resin, and the intermediate layer has a hardness ($H_M$) in Shore D hardness of 36 to 50, a base resin of the cover is formed from thermoplastic resin, and the cover has a hardness ($H_L$) in Shore D hardness of 58 to 69, the surface hardness of the center ($H_S$) is higher than the hardness of the intermediate layer ($H_M$) by 0 to 15, and the hardness of the cover ($H_L$) is higher than the hardness of the intermediate layer ($H_M$) by 10 to 28, assuming that the total of a periphery length of the dimples is represented by X (mm) and a ratio of the golf ball surface area occupied by the dimples to the total surface area of the golf ball is represented by Y, the X and Y satisfy the correlation represented by the following formula (1):

$$X \leq 1930 + 3882Y \quad (1)$$

and Y is within the range of 0.70 to 0.90, wherein the base resin of the intermediate layer is formed from thermoplastic resin having a weight ratio of thermoplastic elastomer to ionomer resin of 20/80 to 70/30, and the base resin of the cover is formed from thermoplastic elastomer comprising ionomer resin as a main component.

12. The three-piece solid golf ball according to claim 4, wherein the base resin of the intermediate layer is formed from thermoplastic resin having a weight ratio of thermoplastic elastomer to ionomer resin of 20/80 to 50/50, and the base resin of the cover is formed from thermoplastic elastomer comprising ionomer resin as a main component.

* * * * *